United States Patent [19]
Crosby

[11] Patent Number: 5,585,868
[45] Date of Patent: Dec. 17, 1996

[54] VIDEO QUALITY IMPROVEMENT

[75] Inventor: Philip S. Crosby, Portland, Oreg.

[73] Assignee: Tektronix, Inc., Wilsonville, Oreg.

[21] Appl. No.: 431,947

[22] Filed: May 1, 1995

[51] Int. Cl.$^6$ .................................................. H04N 11/02
[52] U.S. Cl. ...................... 348/796; 348/791; 348/642; 348/708
[58] Field of Search ...................... 348/390, 391, 348/393, 394, 395, 396, 642, 659, 660, 712, 713, 708; H04N 11/02, 11/00

[56] References Cited

U.S. PATENT DOCUMENTS

| | | | |
|---|---|---|---|
| 4,141,034 | 2/1979 | Netravali et al. | 348/396 |
| 4,812,903 | 3/1989 | Wegensenner et al. | 358/80 |
| 5,130,786 | 7/1992 | Murata et al. | 348/391 |
| 5,412,427 | 5/1995 | Rabbani et al. | 348/396 |

Primary Examiner—David E. Harvey
Attorney, Agent, or Firm—Francis I. Gray

[57] ABSTRACT

A video quality improvement method and apparatus for a television system recovers lost brightness information from the chrominance channels of an encoder due to processing errors, such as quantization roundoff errors, and adds it to the luminance input to the luminance channel of the encoder. Component signals from a video source are input to the encoder. The encoder provides an encoded video output signal as well as reconstructed component signals. From the encoder characteristics the processing errors for the chrominance channels are determined. The partial derivatives for each of the component signals are obtained, and the error in brightness is determined by summing the products of the errors and the corresponding chrominance partial derivatives. The luminance component signal is corrected by dividing the error in brightness by the luminance partial derivative and subtracting the result from the input luminance component signal. The corrected luminance component signal is processed by the encoder.

5 Claims, 5 Drawing Sheets

VIDEO QUALITY IMPROVEMENT

BACKGROUND OF THE INVENTION

The present invention relates to encoding of video signals, and more particularly to a video quality improvement method and apparatus for correcting the brightness of a luminance channel due to brightness information lost during quantization of chrominance in the chrominance channels of an encoder.

For reasons of economy most television transmission, storage and processing means use a lower performance channel for the chrominance signal C than for the luminance signal Y of component video. The chrominance signal approximately represents the way that an element of a picture image is colored. The luminance component signal approximately represents the apparent brightness of that same picture element. This is in accordance with the well-known observation that the human eye is more tolerant of errors in color than of errors in apparent brightness. However also for reasons of economy the primary color signals GBR are "gamma corrected", which compresses their dynamic range to improve the signal-to-noise ratio for low brightness elements at the expense of a lessened signal-to-noise ratio for high brightness elements. This is in accordance with the well-known Weber-Fechtner relation that represents the dynamic response of the human eye as being approximately logarithmic.

Since the Y and C signals are derived from gamma-corrected primary color signals using a linear matrix, the C signal does substantially contribute to the apparent brightness of a picture element, particularly in the case of certain highly saturated colors. Additionally some television systems use a linear matrix that is not derived from the luminance coefficients for the phosphors of a CRT display, resulting in errors in the apparent brightness of even neutral colors when C signal errors are present. This brightness noise produces objectionable artifacts in the displayed picture, and has long been understood to be a consequence of the economies gained through Y-C transmission and gamma correction. Indeed, so long as the errors are noise, i.e., nondeterministic, they are uncorrectable.

FIGS. 1 and 2 illustrate the expected root-mean-square noise in apparent brightness due to unit amounts of noise in the Pb and Pr chrominance component signals, which are the two components of the C signal. The numbers "709" and "601" in the titles of these figures refer to the video standards from which the matrix coefficients are taken. The 709 standard is an orthogonal standard and the 601 standard is a non-orthogonal standard, as is well known in the art. To understand the significance of this incidental brightness noise, labeled LUM in the figures, the corresponding behavior when noise is added to the Y signal channel is examined.

When the same amount of error signal is added to the Y channel, approximately unit errors in apparent brightness result when using a Y signal amplitude of 0.5, as shown in FIGS. 3 and 4. Thus the incidental errors depicted in FIGS. 1 and 2 may result in substantial impairment of picture quality, particularly if the signal transmission quality of the C channel is impaired relative to that of the Y channel, as is usually the case. Further unless photometric measurements are made at the display, this type of impairment, although visible, may go unmeasured.

Some forms of video encoding, such as video compression, may involve the addition of deterministic errors, such as roundoff errors, to the C channel. These error signals are the result of quantizing the chrominance component signals, and may be available at the encoder as the C channel signal is being generated. The contributions of errors in the chrominance component signal channels to the perceived brightness are depicted in FIGS. 5–8. These figures depict the partical derivatives of brightness versus noise in the Pb and Pr channels for a Y signal amplitude of 0.5, which for neutral colors should result in a display brightness of about 0.26 of the brightness of reference white, i.e., Y=1.0.

What is desired is an encoder that anticipates the true brightness information that is lost in the chrominance channels due to encoder quantization and then applies an appropriate correction to the luminance channel before transmission.

SUMMARY OF THE INVENTION

Accordingly the present invention provides a video quality improvement method and apparatus for determining lost brightness information in the chrominance channels and adding it back into the luminance channel prior to encoding. Component video signals are input to an encoder having a luminance channel and chrominance channels, the luminance channel being a wideband channel and the chrominance channels usually being band limited. The output from the encoder is a compressed video signal as well as reconstructed chrominance component signals representing the picture image one frame prior to that represented by the input component signals. The component signals are processed by the encoder and the errors introduced by the encoder processing of the chrominance, such as quantization roundoff errors, for each Y channel pixel are determined as a function of the encoder characteristics, spatially interpolating as required. The partical derivatives of the component signals Y, Pb, Pr are obtained by comparing the component signals input to and output from the encoder. The error in brightness is then determined by summing the products of the processing errors and the corresponding partial derivatives for the chrominance channels. The Y channel pixel is corrected by dividing the error in brightness by the partial derivative of the luminance component signal and subtracting the result from the original Y channel pixel value, or directly from the compressed Y channel value for an MPEG encoder. The corrected luminance signal is processed by the luminance channel of the encoder.

The objects, advantages and other novel features of the present invention are apparent from the following detailed description when read in conjunction with the appended claims and attached drawing.

DESCRIPTION OF THE PREFERRED EMBODIMENT

Figure 5:
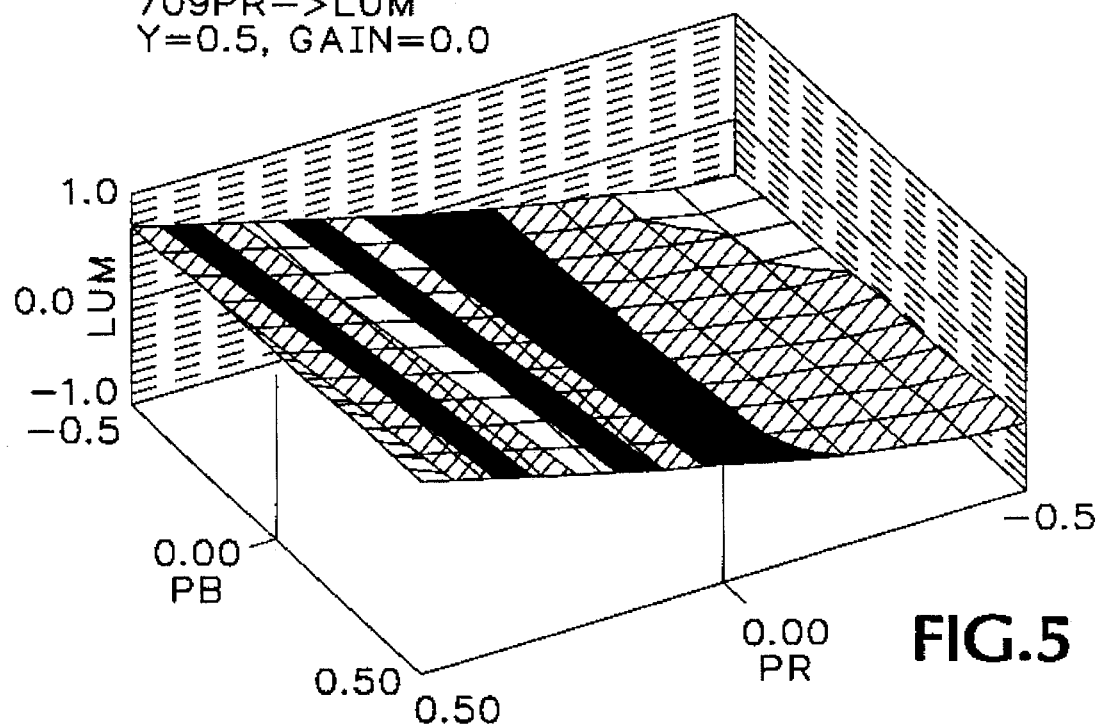
FIG. 5 is a plot of the partial derivatives of brightness versus PR for an orthogonal matrix.
Figure 6:
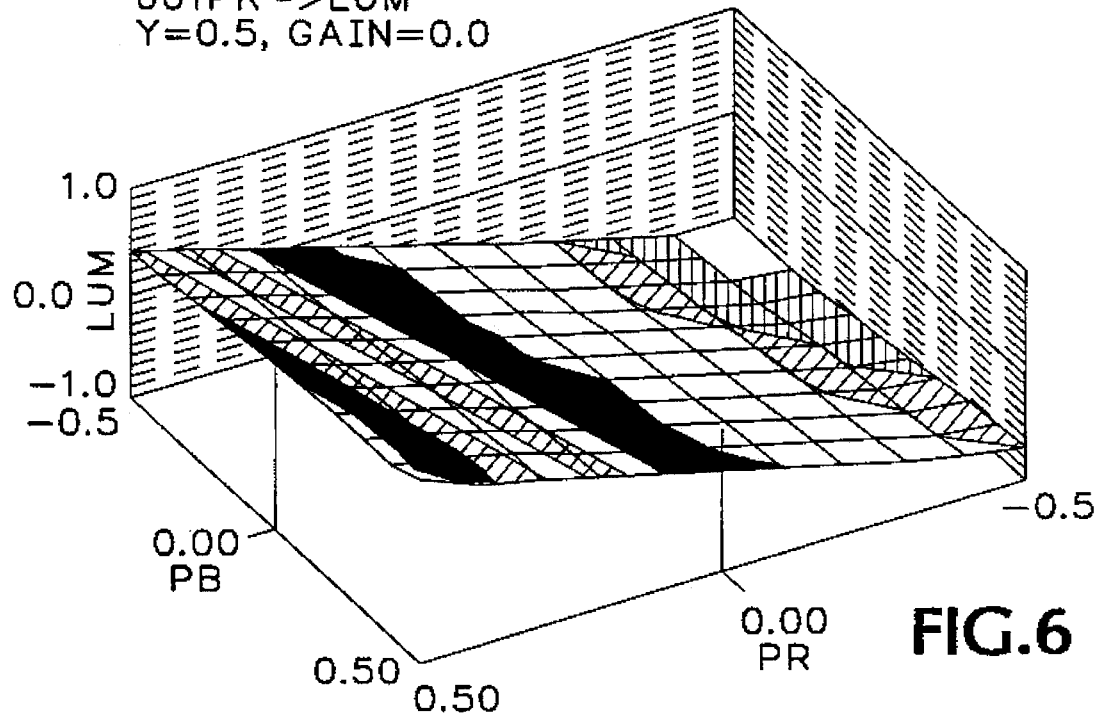
FIG. 6 is a plot of the partial derivatives of brightness versus PR for a non-orthogonal matrix.
Figure 7:
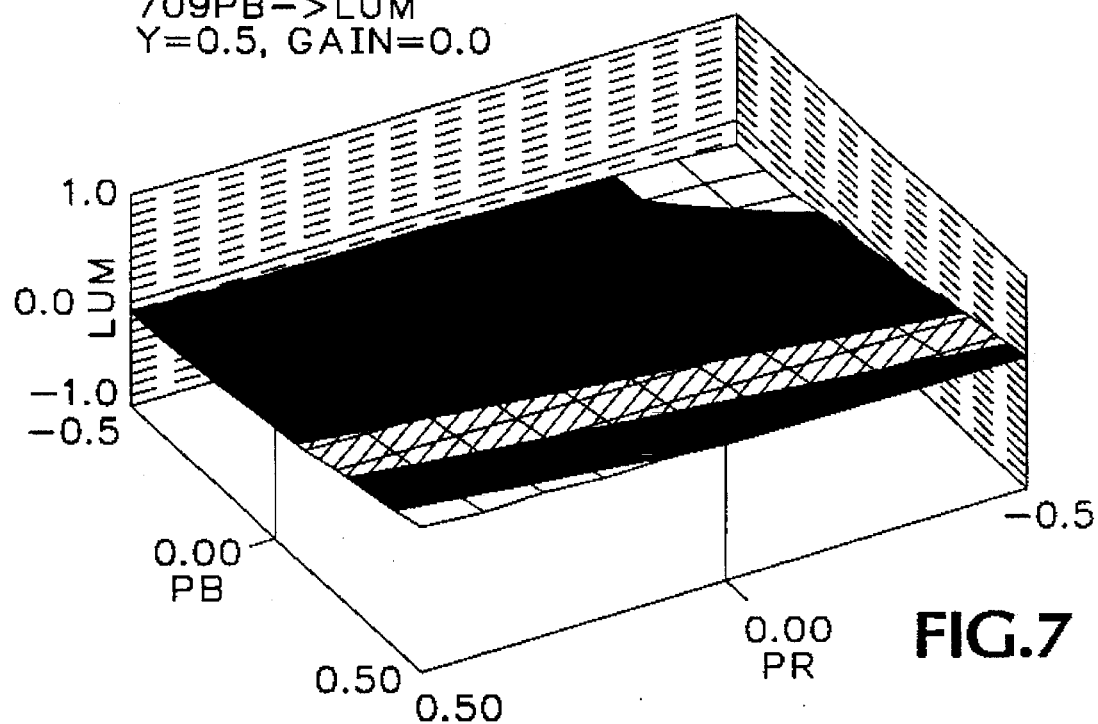
FIG. 7 is a plot of the partial derivatives of brightness versus PB for an orthogonal matrix.
Figure 8:
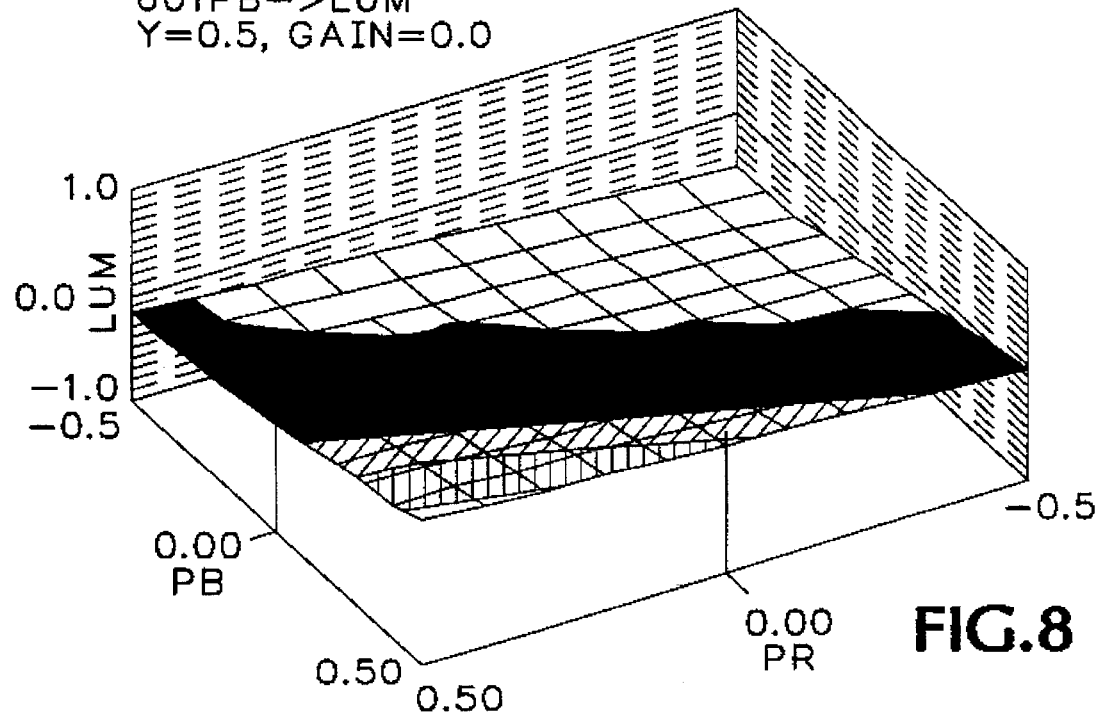
FIG. 8 is a plot of the partial derivatives of brightness versus PB for a non-orthogonal matrix.

Referring back to FIGS. 5 and 7 the information from which these figures are derived is used to determine the error in apparent brightness caused by roundoff errors in the Pb and Pr signals for the system using the orthogonal matrix. To encode the set of Y, Pb, Pr values of {0.5, −0.2, −0.3} where there are roundoff errors of Epr=−0.014 and Epb=+0.008, the respective partial derivatives from FIGS. 5 and 7 are found to be P|pr=−0.369 and P|pb=−0.136. The resulting change in apparent brightness is given by:

$$El=(Epb*P|pb)+(Epr*P|pr)$$

or $$El=(-0.014* -0.369)+(+0.008* -0.136)=0.004078$$

Figure 1:
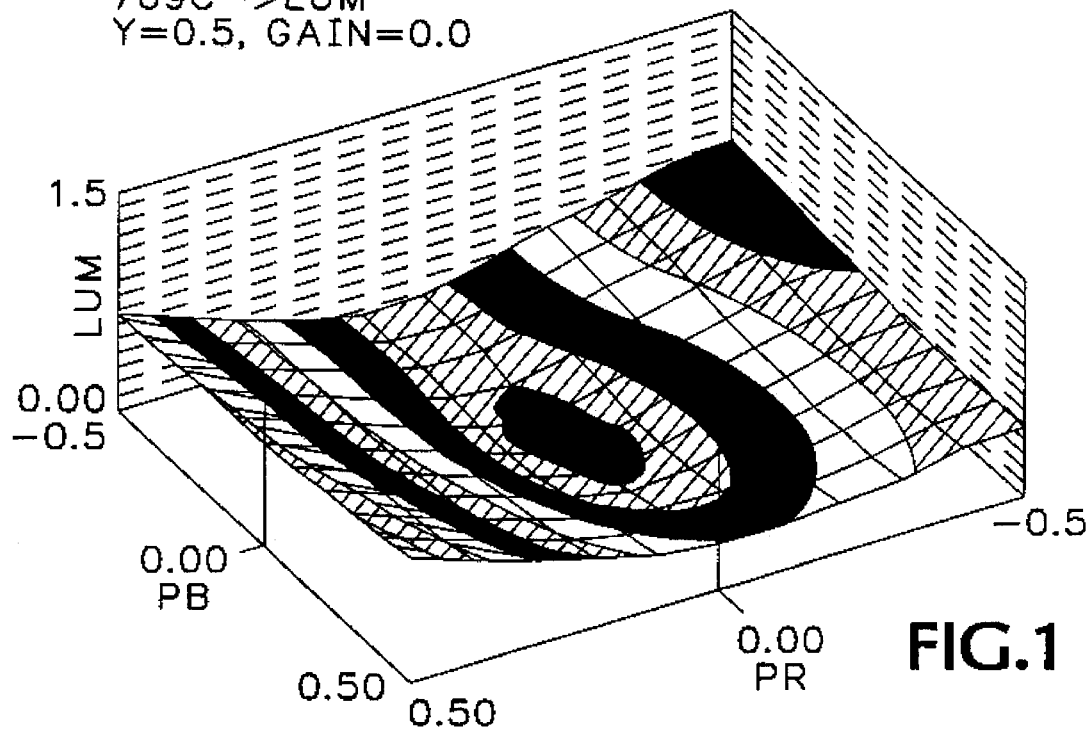
FIG. 1 is a plot of incidental brightness noise contribution due to chroma noise for an orthogonal linear matrix.
Figure 2:
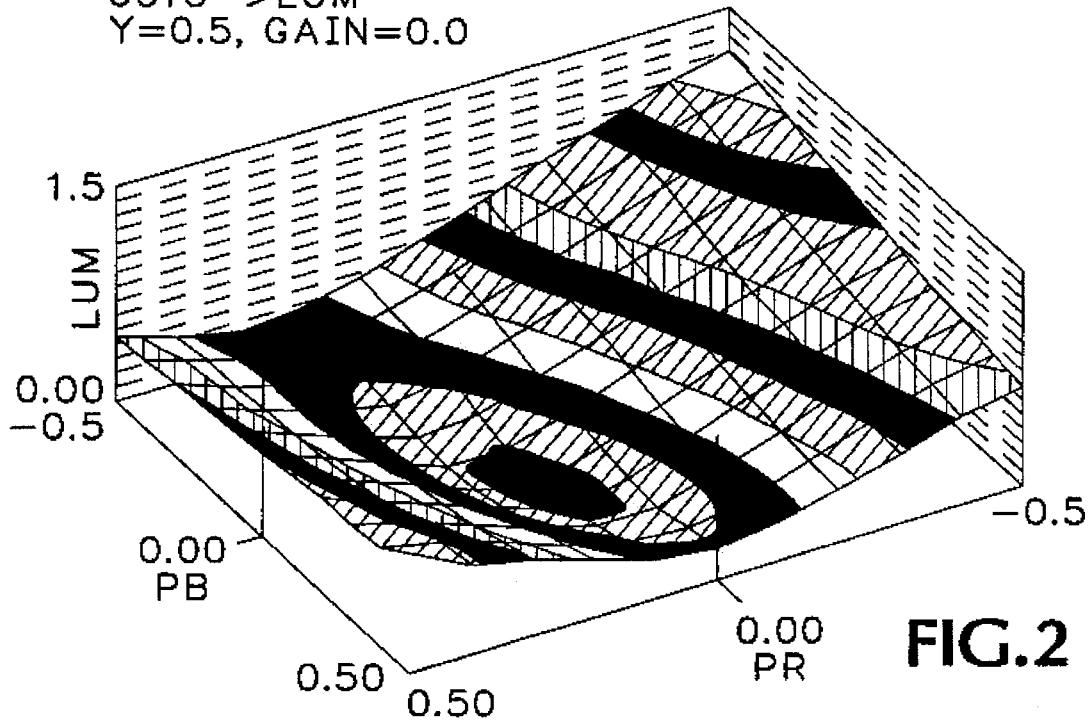
FIG. 2 is a plot of incidental brightness noise contribution due to chroma noise for a non-orthogonal linear matrix.
Figure 3:
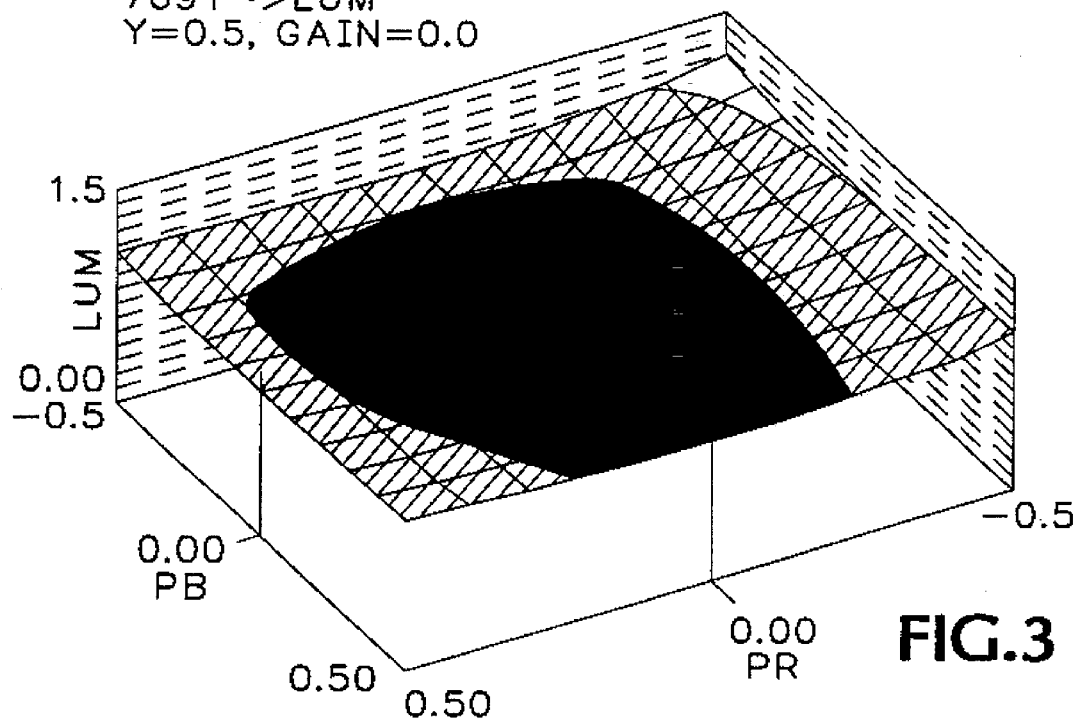
FIG. 3 is a plot of brightness contribution due to luma channel noise for an orthogonal linear matrix.
Figure 4:
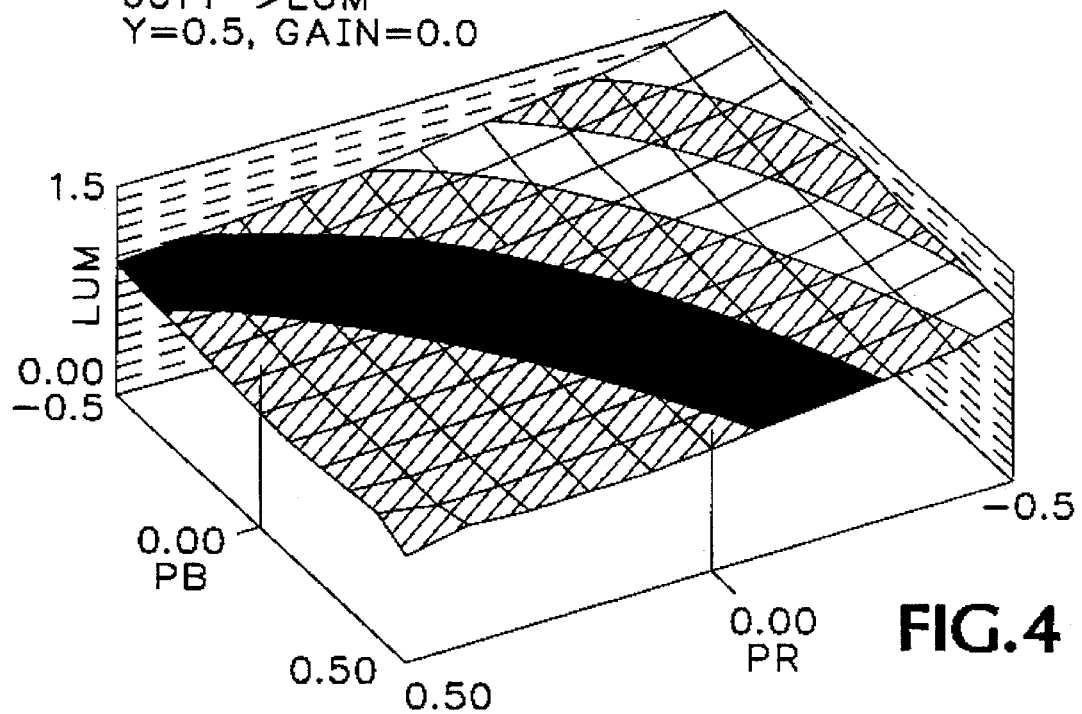
FIG. 4 is a plot of brightness contribution due to luma channel noise for a non-orthogonal linear matrix.

Normally this error in brightness goes uncorrected. However from the data that produced FIG. 3 the partial derivative of brightness versus luminance noise P|y is 1.016. Therefore the value of the luminance signal should be changed according to:

$$\Delta Y=El/P|y$$

or $$\Delta Y=-(0.004078/1.016)=-0.0040138$$

and $$Yc=Y-\Delta Y$$

This "corrected" Y signal is then encoded. Although the encoding process introduces roundoff errors in the Y signal channel as well, precorrection of the Y signal removes the bias that is introduced by the errors in the C channels.

Therefore the process for obtaining the corrected Y signal is:

1. Process the chrominance signal and determine the errors caused by the processing in Pb and Pr (Epb and Epr) corresponding to each Y pixel, spatially interpolating as required;

2. Look up or calculate partial derivatives P|pr(Y,Pb,Pr), P|pb(Y, Pb, Pr) and P|y(Y,Pb,Pr);

3. Determine the error in brightness by summing the products of the errors and the corresponding partial derivatives—El=(P|pb*Epb)+(P|pr*Epr);

4. Correct the corresponding Y picture element(s) by dividing El by P|y and subtracting the result from the original Y value(s); and 5. Process the corrected Y signal.

Upon inspection of FIGS. 3–8 it is clear that a reasonably good analytic approximation of the error surfaces may be derived, permitting easy calculation of the partial derivatives. Further there is little change in the accuracy of the approximation if for convenience coded values of Y, Pb, Pr are used instead of the original values.

Figure 9:
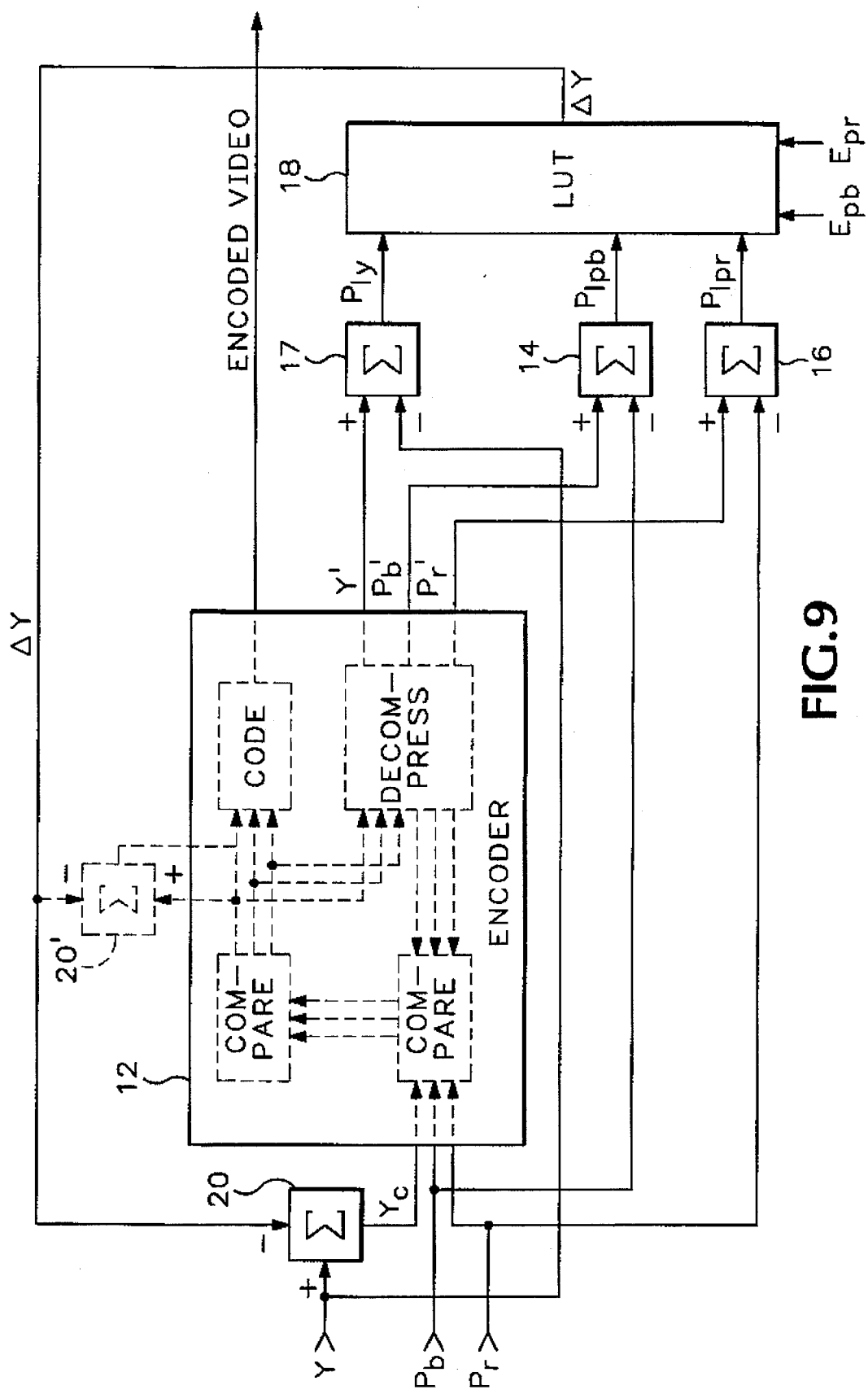
FIG. 9 is a block diagram of a video quality improvement apparatus according to the present invention.

Referring now to FIG. 9 an encoder 12, such as an MPEG-2 encoder which compresses the video component signals using a discrete cosine transform (DCT), has as inputs the component signals, Y, Pb, Pt. The encoder 12 has a compression section for compressing the component signals, a coder section for coding the compressed component signals, a decompression section for reconstructing the component signals, and a comparator section for comparing the reconstructed component signals with the next set of input component signals representing the next frame of the video sequence. The reconstructed component signals Y', Pb', Pr' for one video frame are output by the encoder 12 and input together with the input components from the next frame to respective adders 14, 16, 17 to produce the partial derivatives of the component signals P|pr, P|pb, P|Y. The partial derivatives of the component signals are input as addresses to a look-up table 18. The values in the look-up table 18 reflect the error in apparent brightness caused by the processing errors in the chrominance channels, such as quantization roundoff errors, to provide an output that is the amount, ΔY, by which the Y signal should be changed. The Y change amount is input to a summation circuit 20 for combination with the input luminance signal to produce the corrected luminance signal Yc. Yc is input to the encoder 12 for encoding. Alternatively in the case of the MPEG encoder, the compressed Y values may be corrected directly rather than the pixel values themselves, as shown by adder 20', since it is the quantization of the compressed chrominance values that causes the problem in the first place.

The values in the lookup table 18 may be calculated from the known parameters for the video standard being used in the same manner as FIGS. 1–8 are derived. Alternatively the lookup table may be replaced with appropriate computational circuitry, either in the form of a microprocessor or discrete elements to determine the necessary values on the fly, as is well known in the art.

The present invention is especially applicable to compressed video transmission, where the encoder has full information about how the chrominance is quantized, and preserves brightness information by applying any true brightness information lost in the chrominance quantization to the luminance channel. Thus the present invention provides a video quality improvement method and apparatus by determining the amount of brightness being processed by the chrominance channels of an encoder due to processing errors, and adding that brightness back into the luminance channel of the encoder.

What is claimed is:

1. A video quality improvement method comprising the steps of:

determining a processing error for each of the chrominance channels of a video encoder;

deriving from component signals input to and output from the video encoder a partial derivative for each of the component signals, the component signals including a luminance component signal and a pair of chrominance component signals;

generating a luminance correction signal as a function of the partial derivatives and the processing errors; and combining the luminance correction signal with the luminance component signal to produce a corrected luminance component signal for input to the encoder.

2. The video quality improvement method as recited in claim 1 wherein the deriving step comprises the step of subtracting the component signals at the input of the encoder from the respective component signals at the output of the encoder to produce the partial derivatives.

3. The video quality improvement method as recited in claim 1 wherein the generating step comprises the steps of:

summing the products of each chrominance partial derivative and the corresponding processing error to produce a brightness error signal; and dividing the brightness error signal by the luminance partial derivative to produce the luminance correction signal.

4. A video quality improvement apparatus comprising:

means for deriving from component signals input to and output from a video encoder a partial derivative for each of the component signals, the component signals including a luminance component signal and a pair of chrominance component signals;

means for generating a luminance correction signal as a function of the partial derivatives and predetermined processing errors for each chrominance channel of the video encoder; and means for combining the luminance correction signal with the luminance component signal to produce a corrected luminance component signal for input to the encoder.

5. The video quality improvement apparatus as recited in claim 4 wherein the deriving means comprises means for subtracting the component signals at the input of the encoder from the respective component signals at the output of the encoder to produce the partial derivatives.

* * * * *